United States Patent
Saha et al.

(10) Patent No.: US 12,039,256 B2
(45) Date of Patent: Jul. 16, 2024

(54) MACHINE LEARNING-BASED GENERATION OF SYNTHESIZED DOCUMENTS

(71) Applicant: Dell Products L.P., Round Rock, TX (US)

(72) Inventors: Saheli Saha, Kolkata (IN); Prerit Jain, New Delhi (IN); Ramakanth Kanagovi, Bengaluru (IN); Prakash Sridharan, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/969,862

(22) Filed: Oct. 20, 2022

(65) Prior Publication Data

US 2024/0135088 A1   Apr. 25, 2024

(51) Int. Cl.
*G06F 40/166* (2020.01)
*G06F 40/289* (2020.01)
(Continued)

(52) U.S. Cl.
CPC .......... *G06F 40/166* (2020.01); *G06F 40/289* (2020.01); *G06N 20/00* (2019.01); *G06F 40/205* (2020.01)

(58) Field of Classification Search
CPC ...... G06F 16/345; G06F 40/56; G06F 40/137; G06F 40/166; G06F 40/289; G06F 40/205; G06N 20/00
See application file for complete search history.

(56) References Cited

U.S. PATENT DOCUMENTS

2017/0262416 A1* 9/2017 Rezgui ................. G06F 40/146
2017/0277668 A1* 9/2017 Luo ........................ G06F 16/345
(Continued)

FOREIGN PATENT DOCUMENTS

WO    WO-2005050472 A2 *  6/2005   ............. G06F 17/27

OTHER PUBLICATIONS

Zeng et al., "Efficient Summarization with Read-Again and Copy Mechanism", published: Nov. 2016, publisher: ArXiv, pp. 1-11 (Year: 2016).*

(Continued)

*Primary Examiner* — Wilson W Tsui
(74) *Attorney, Agent, or Firm* — Ryan, Mason & Lewis, LLP

(57) ABSTRACT

An apparatus comprises a processing device configured to receive a request to generate a synthesized document comprising one or more search terms, and to extract, utilizing a first machine learning model, keywords from a set of documents. The processing device is also configured to select first content for inclusion in a first section of the synthesized document based on a similarity of the search terms and the extracted keywords from corresponding first sections of the set of documents, and to determine, utilizing a second machine learning model that takes as input the selected first content, a set of terms for a second section of the synthesized document. The processing device is further configured to select second content for inclusion in the second section of the synthesized document based on a similarity of the determined set of terms and the extracted keywords from corresponding sections of the set of documents.

20 Claims, 15 Drawing Sheets

(51) Int. Cl.
   *G06N 20/00* (2019.01)
   *G06F 40/205* (2020.01)

(56) References Cited

U.S. PATENT DOCUMENTS

| | | | | |
|---|---|---|---|---|
| 2020/0104353 | A1* | 4/2020 | Chua | G06F 16/337 |
| 2020/0134089 | A1* | 4/2020 | Sankaran | G06N 3/045 |
| 2020/0134091 | A1* | 4/2020 | Feigenblat | G06F 16/3334 |
| 2021/0157829 | A1* | 5/2021 | Boni | G06F 17/18 |
| 2022/0067107 | A1* | 3/2022 | Overlund | G06F 16/906 |
| 2022/0215274 | A1* | 7/2022 | Mattivi | G06F 16/345 |
| 2023/0027310 | A1* | 1/2023 | Muralidharan | G06F 40/166 |
| 2023/0315969 | A1* | 10/2023 | Religa | G06F 40/258 |
| | | | | 715/202 |

OTHER PUBLICATIONS

Gehrmann et al, "Bottom Up Abstractive Summarization", published: Oct. 2018, publisher: ArXiv, pp. 1-12 (Year: 2018).*
Fan et al, "Hierarchical Neural Story Generation", published: May 2018, publisher: ArXiv, pp. 1-11 (Year: 2018).*
P. Nayak, "Understanding Searches Better Than Ever Before," https://blog.google/products/search/search-language-understanding-bert/, Oct. 25, 2019, 6 pages.
M. Grootendorst, "KeyBERT," https://maartengr.github.io/KeyBERT/, Accessed Aug. 17, 2022, 3 pages.
Spacy, "Linguistic Features," https://spacy.io/usage/linguistic-features, Accessed Aug. 17, 2022, 60 pages.
Hugging Face, "GPT-2," https://huggingface.co/gpt2, Accessed Aug. 17, 2022, 7 pages.
Y. Qian et al., "Bert-Based Text Keyword Extraction," Journal of Physics: Conference Series, vol. 1992, Feb. 2021, 6 pages.
Y.-C. Chen et al., "Distilling Knowledge Learned in BERT for Text Generation," arXiv:1911.03829v3, Jul. 17, 2020, 13 pages.
A. Radford et al., "Language Models are Unsupervised Multitask Learners," Technical report, OpenAi, 2019, 24 pages.
Y. Zhang et al., "Keyphrase Generation Based on Deep Seq2seq Model," IEEE Access, vol. 6, Sep. 7, 2018, pp. 46047-46057.
R. Horev, "BERT Explained: State of the Art Language Model for NLP," https://towardsdatascience.com/bert-explained-state-of-the-art-language-model-for-nlp-f8b21a9b6270, Nov. 10, 2018, 8 pages.
Y. Zhang et al., "Abstract Text Summarization with a Convolutional Seq2seq Model," Applied Sciences, vol. 9, No. 1665, Apr. 23, 2019, 13 pages.

* cited by examiner

MACHINE LEARNING-BASED GENERATION OF SYNTHESIZED DOCUMENTS

FIELD

The field relates generally to information processing, and more particularly to techniques for managing data.

BACKGROUND

In many information processing systems, data stored electronically is in an unstructured format, with documents comprising a large portion of unstructured data. Collection and analysis, however, may be limited to highly structured data, as unstructured text data requires special treatment. For example, unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide techniques for machine learning-based generation of synthesized documents.

In one embodiment, an apparatus comprises at least one processing device comprising a processor coupled to a memory. The at least one processing device is configured to perform the steps of receiving a request to generate a synthesized document, the request comprising a query with one or more search terms, and extracting, utilizing a first machine learning model, keywords from a set of documents, each of the documents comprising two or more different sections. The at least one processing device is also configured to perform the steps of selecting first content from the set of documents for inclusion in a first section of the synthesized document based at least in part on a determined similarity of the one or more search terms and one or more of the extracted keywords from corresponding first sections of the set of documents, and determining, utilizing a second machine learning model that takes as input the selected first content, a set of terms for a second section of the synthesized document. The at least one processing device is further configured to perform the steps of selecting second content from the set of documents for inclusion in the second section of the synthesized document based at least in part on a determined similarity of the determined set of terms for the second section of the synthesized document and one or more of the extracted keywords from corresponding sections of the set of documents, and generating the synthesized document comprising the selected first content and the selected second content.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
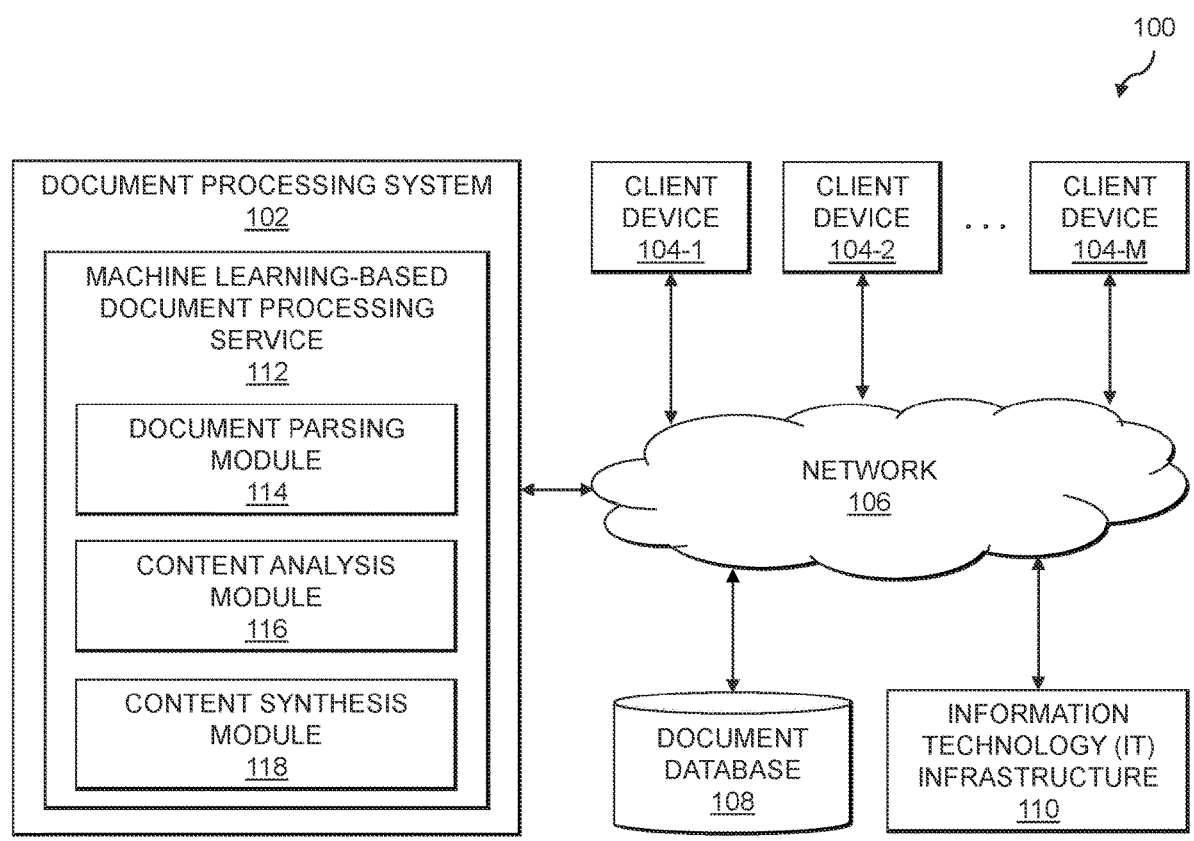
FIG. 1 is a block diagram of an information processing system configured for machine learning-based generation of synthesized documents in an illustrative embodiment of the invention.

FIG. 1 shows an information processing system 100 configured in accordance with an illustrative embodiment to provide functionality for machine learning-based generation of synthesized documents. The information processing system 100 includes a document processing system 102 and a plurality of client devices 104-1, 104-2, . . . 104-M (collectively client devices 104). The document processing system 102 and client devices 104 are coupled to a network 106. Also coupled to the network 106 is a document database 108, which may store various information relating to documents associated with assets of an information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The document database 108, as discussed above, is configured to store and record information relating to documents to be analyzed and processed by the document processing system 102 utilizing the machine learning-based document processing service 112. Such information may include documents themselves (e.g., tech support call and chat logs, sales documents, articles, etc.) as well as metadata associated with the documents. The document database 108 may also store information utilized for training one or more machine learning models as described in further detail elsewhere herein. The document database 108 in some embodiments is implemented using one or more storage systems or devices associated with the document processing system 102. In some embodiments, one or more of the storage systems utilized to implement the document database 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the document processing system 102 and the machine learning-based document processing service 112, as well as to support communication between the document processing system 102, the machine learning-based document processing service 112, and other related systems and devices not explicitly shown.

In some embodiments, the client devices 104 are configured to access or otherwise utilize the IT infrastructure 110. The IT infrastructure 110 may comprise a plurality of assets (e.g., physical or virtual computing resources) of a business, entity or other enterprise. In such cases, the client devices 104 may be associated with a sales team, support personal, system administrators, IT managers or other authorized personnel or users configured to access and utilize the machine learning-based document processing service 112 to synthesize documents for a particular scenario. For example, a given one of the client devices 104 may be used to access a graphical user interface (GUI) provided by the machine learning-based document processing service 112 to input search terms regarding a given scenario, and to receive recommendations of content to be used for generating or synthesizing new documentation for the given scenario. The term "user" herein is intended to be broadly construed so as to encompass numerous arrangements of human, hardware, software or firmware entities, as well as combinations of such entities.

The machine learning-based document processing service 112 may be provided as a cloud service accessible by the client devices 104 to allow for users to generate or synthesize documentation from various sources (e.g., different assets of the IT infrastructure 110 representing different document or other content sources). In some embodiments, the client devices 104 may implement host agents that are configured for automated transmission of information regarding a particular scenario to the machine learning-based document processing service 112, and to automatically receive newly-generated documents relating to that scenario therefrom. It should be noted that a "host agent" as this term is generally used herein may comprise an automated entity, such as a software entity running on a processing device. Accordingly, a security agent or host agent need not be a human entity.

As shown in FIG. 1, the document processing system 102 comprises the machine learning-based document processing service 112. As will be described in further detail below, the machine learning-based document processing service 112 is configured to utilize machine learning for automatically generating or synthesizing content for different scenarios (e.g., different input search terms). Although shown as an element of the document processing system 102 in this embodiment, the machine learning-based document processing service 112 in other embodiments can be implemented at least in part externally to the document processing system 102, for example, as a stand-alone server, set of servers or other type of system coupled to the network 106. In some embodiments, the machine learning-based document processing service 112 may be implemented at least in part within one or more of the client devices 104.

The machine learning-based document processing service 112 is assumed to be implemented using at least one processing device. Each such processing device generally comprises at least one processor and an associated memory, and implements one or more functional modules for controlling certain features of the machine learning-based document processing service 112. In the FIG. 1 embodiment, the machine learning-based document processing service 112 comprises a document parsing module 114, a content analysis module 116, and a content synthesis module 118.

The document parsing module 114 is configured to obtain documents (e.g., from the document database 108, from assets of the IT infrastructure 110 providing document sources, etc.) and to break the documents down into content chunks (e.g., pages, paragraphs, sentences, etc.). The content chunks may be labeled or categorized into sections (e.g., introduction, body, conclusion) characterizing where in the source documents those content chunks were from. The content chunks are the analyzed using the content analysis module 116 to extract keywords therefrom using one or more machine learning models. The content analysis module 116 is also configured to process the extracted keywords to determine uniqueness scores characterizing the uniqueness thereof, and to remove overlapping or non-unique keywords. The unique keywords are then converted into word embeddings for use by the content synthesis module 118. The content synthesis module 118 is configured to perform a context continuity analysis to assemble content from multiple documents into a new synthesized document. The content synthesis module 118 is configured to receive a search query characterizing a scenario, and to convert the words of the search query into word embeddings. The word embeddings of the search query are then compared against the word embeddings of the extracted keywords to determine content to be added to the new synthesized document. This may be an iterative process, where "introduction" content is first selected, followed by use of a machine learning model to generate an artificial continuity to the selected introduction content. The generated artificial continuity may then be converted into paragraph or word embeddings that are again compared against the word embeddings of the extracted keywords to determine content for the next section (e.g., the "body" section) of the new synthesized document. This may repeat for one or more subsequent sections (e.g., the "conclusion" section).

It is to be understood that the particular set of elements shown in FIG. 1 for machine learning-based generation of synthesized documents is presented by way of illustrative example only, and in other embodiments additional or alternative elements may be used. Thus, another embodiment may include additional or alternative systems, devices and other network entities, as well as different arrangements of modules and other components.

It is to be appreciated that the particular arrangement of the document processing system 102, the machine learning-based document processing service 112, the document parsing module 114, the content analysis module 116, and the content synthesis module 118 illustrated in the FIG. 1 embodiment is presented by way of example only, and alternative arrangements can be used in other embodiments. As discussed above, for example, the document processing system 102, the machine learning-based document processing service 112, the document parsing module 114, the content analysis module 116, and the content synthesis module 118 may in some embodiments be implemented internal to one or more of the client devices 104. As another example, the functionality associated with the document parsing module 114, the content analysis module 116, and the content synthesis module 118 may be combined into one module, or separated across more than three modules with the multiple modules possibly being implemented with multiple distinct processors or processing devices.

At least portions of the machine learning-based document processing service 112 (e.g., the document parsing module 114, the content analysis module 116, and the content synthesis module 118) may be implemented at least in part in the form of software that is stored in memory and executed by a processor.

The machine learning-based document processing service 112, and other portions of the system 100, may in some embodiments be part of cloud infrastructure as will be described in further detail below. The cloud infrastructure hosting the machine learning-based document processing service 112 may also host any combination of one or more of the client devices 104, the document database 108, and the IT infrastructure 110, etc.

The machine learning-based document processing service 112, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and machine learning-based document processing service 112, or components thereof (e.g., the document parsing module 114, the content analysis module 116, and the content synthesis module 118) may be implemented on respective distinct processing platforms, although numerous other arrangements are possible. For example, in some embodiments at least portions of the machine learning-based document processing service 112 and one or more of the client devices 104 are implemented on the same processing platform. A given client device (e.g., 104-1) can therefore be implemented at least in part within at least one processing platform that implements at least a portion of the machine learning-based document processing service 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104 and the machine learning-based document processing service 112, or portions or components thereof, to reside in different data centers. Numerous other distributed implementations are possible. The machine learning-based document processing service 112 can also be implemented in a distributed manner across multiple data centers.

Additional examples of processing platforms utilized to implement the machine learning-based document processing service 112 in illustrative embodiments will be described in more detail below in conjunction with FIGS. 9 and 10.

It is to be appreciated that these and other features of illustrative embodiments are presented by way of example only and should not be construed as limiting in any way.

An exemplary process for machine learning-based generation of synthesized documents will now be described in more detail with reference to the flow diagram of FIG. 2. It is to be understood that this particular process is only an example, and that additional or alternative processes for machine learning-based generation of synthesized documents can be carried out in other embodiments.

In this embodiment, the process includes steps 200 through 210. These steps are assumed to be performed by the machine learning-based document processing service 112 utilizing the document parsing module 114, the content analysis module 116, and the content synthesis module 118. The process begins with step 200, receiving a request to generate a synthesized document, the request comprising a query with one or more search terms. In step 202, keywords from a set of documents are extracted utilizing a first machine learning model. Each of the documents has two or more different sections, and step 202 may include associating section labels with the extracted keywords, the section label for a given keyword identifying which of the two or more different sections of a given document that the given keyword is extracted from. The first machine learning model may comprise a Bidirectional Encoder Representations from Transformers (BERT) keyword extraction model.

In some embodiments, step 202 includes breaking the set of documents into content chunks, and extracting one or more keywords from each of the content chunks. The content chunks may comprise at least one of pages, paragraphs and sentences of textual content. The content chunks may also or alternatively comprise sections of multimedia content. Step 202 may also comprise removing one or more overlapping ones of the extracted keywords based at least in part on term frequency-inverse document frequency (TF-IDF) scores computed for each of the extracted keywords, the TF-IDF score for a given one of the extracted keywords being based at least in part on TF-IDF scores computed for each of two or more words of the given extracted keyword.

Figure 2:
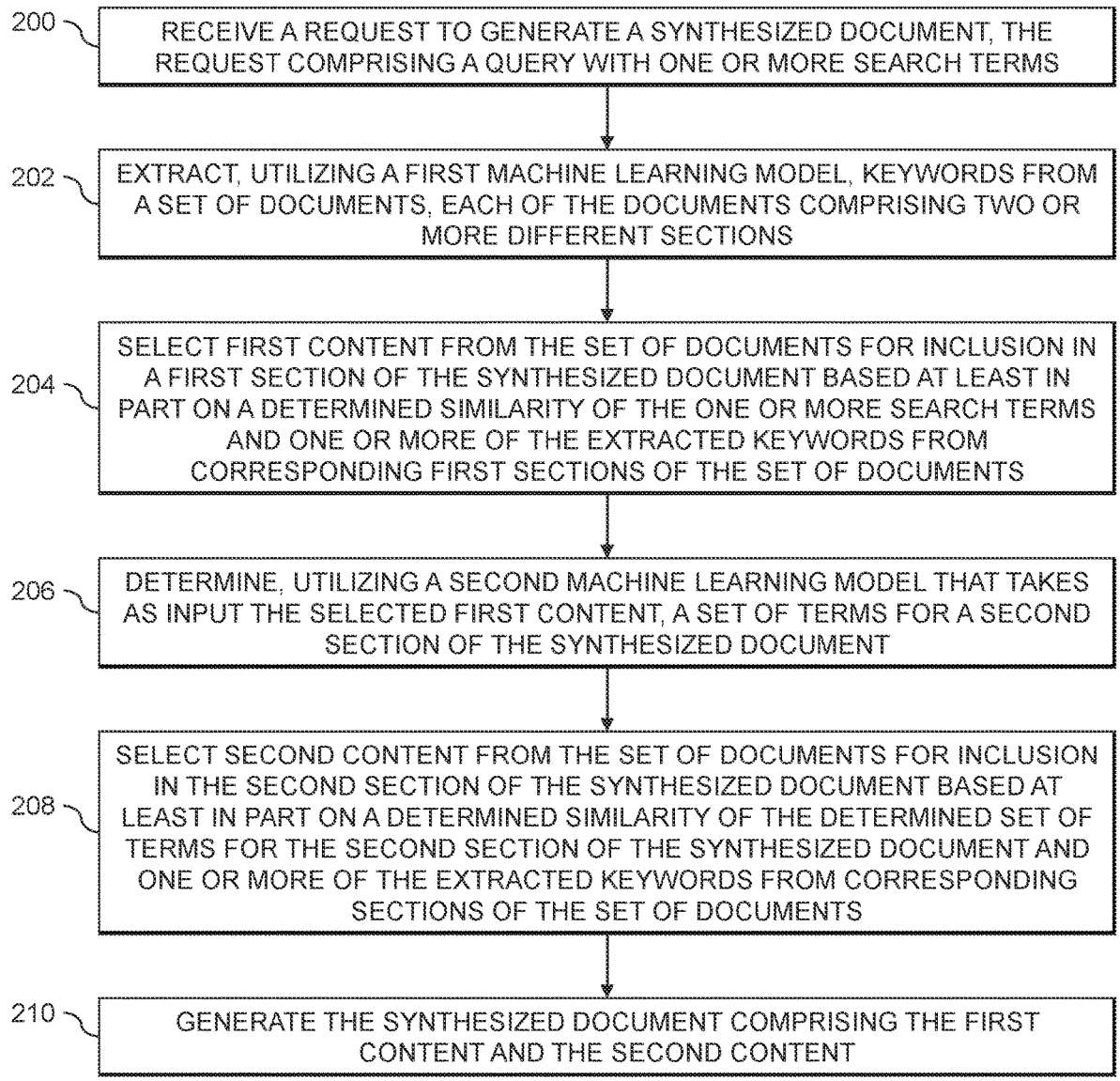
FIG. 2 is a flow diagram of an exemplary process for machine learning-based generation of synthesized documents in an illustrative embodiment.

The FIG. 2 process continues with step 204, selecting first content from the set of documents for inclusion in a first section of the synthesized document based at least in part on a determined similarity of the one or more search terms and one or more of the extracted keywords from corresponding first sections of the set of documents. In step 206, a set of terms for a second section of the synthesized document is determined utilizing a second machine learning model that takes as input the selected first content. Second content from the set of documents is selected for inclusion in the second section of the synthesized document in step 208 based at least in part on a determined similarity of the determined set of terms for the second section of the synthesized document and one or more of the extracted keywords from corresponding sections of the set of documents. Steps 204 and 208 may include selecting content from first and second sections of one or more of the set of documents having keywords exhibiting at least a threshold similarity with the one or more search terms and the determined set of terms for the second section of the synthesized document. The second machine learning model may comprise a sequence to sequence (Seq2Seq) machine learning model. The Seq2Seq machine learning model may be trained on a first corpus of text data from a plurality of enterprise-generic data sources, and may be fine-tuned on a second corpus of text data from one or more enterprise-specific data sources. In some embodiments, determining the similarity between the one or more search terms and the extracted keywords comprises determining a first set of word embeddings for the one or more search terms and a second set of word embeddings for the extracted keywords, and computing a cosine similarity between the first and second sets of word embeddings.

The first section of the synthesized document may comprise an introduction section, and the second section of the synthesized document may comprise a body section. The FIG. 2 process may further include determining, utilizing the second machine learning model that takes as input the selected second content, a set of terms for a third section of the synthesized document, the third section of the synthesized document comprising a conclusion section. Third content from the set of documents may be selected for inclusion in the third section of the synthesized document based at least in part on a determined similarity of the determined set of terms for the third section of the synthesized document and one or more of the extracted keywords from corresponding third sections of the set of documents. The FIG. 2 process continues with step 210, generating the synthesized document comprising the selected first, second and third content.

Illustrative embodiments provide technical solutions for creating custom documentation from unstructured content through the application of ranked semantic similarity and a text-to-text generative machine learning model that ensures context continuity. Various entities build documentation related to products, customer case studies, solutions for specific use cases (e.g., edge computing, artificial intelligence, etc.), etc. Sales and solution building teams of an enterprise, for example, may often encounter scenarios which are very specific to a customer or other target user, or which are specific to a customer or other target user domain. It is important for these teams to effectively communicate the value proposition offered by the enterprise's products and solutions to customers or other target users in order to retain a competitive edge and be the preferred partner to the customers or other target users. Various technical challenges are encountered by such teams when creating content for communication, including the need to review extensive documentation, the likelihood of missing out on crucial information, and polymorphic content.

An enterprise may create a large amount of content to support sales and solution building teams of the enterprise. In order to generate custom content for a specific customer or other target user, such teams are required to perform extensive searches to manually create content. This is a time consuming process, and conventional approaches rely on using search engines with an enterprise's document portal. The voluminous documentation which is available can also lead to missing out on certain critical information points (e.g., which may be key points, the difference in winning or losing a potential customer, etc.). Conventional approaches lack a system that can track and offer top insights from the documentation that is available. Further, in any kind of document library or data store, information can be presented in many different ways (e.g., using different words, technology definitions and jargon, etc.). These variations may contain very interesting information which can easily be missed because of the need to read, watch or review such polymorphic content to compile customized documentation.

Further technical problems are encountered when considering that the creation of customized documentation for a particular scenario (e.g., a particular customer or other target user) may involve use of both internal data sources of an enterprise, as well as content from external data sources outside the enterprise. Such external content may include, for example, market intelligence and sales data produced by third parties, technology reviews, etc. The external content may include important or useful data for a particular scenario. Once such external content is mined, there is also the need to structure the data and make it consumable by enterprise teams. Context continuity is a key consideration when building customized content that is readily consumable by a customer or other target user.

Consider a sales team of an enterprise that seeks to build customized content (e.g., a sales proposal, talking points, etc.) for a particular scenario. The sales team of an enterprise may encounter varied scenarios for sales/solution proposals, and must prepare extensively for conversations with customers. Each scenario may require curated responses to "win" the customer's confidence. With rapidly transforming products and solutions, shortening the time to response is increasingly important. Simplifying the process of building sales proposals or solution content is thus critical to make an enterprise more agile. Scenario-specific talking points can go a long way in building customer confidence in a proposed solution. Further, the shift to "as-a-service" models means there are more direct touch points with customers. Curated content for proposals and talking points can transform the entire sales and support experience.

Sales proposal generation includes building a customer proposal, which involves significant search and compilation effort. Often, content is built static and generic with a "one size fits all" approach. To customize content, extensive manual effort is needed to read and source content to build into proposals. This process is often affected by lack of coverage of the complete content that is available to build the proposal. Talking point generation includes preparing for a conversation with a customer, and involves preparation in advance of talking points and responses to potential customer queries. The lack of a ready response system can lead to longer response time which can lead to competitors coming into play. A ready response system for generating talking points for a customer needs to be contextually relevant and up to date. Key challenges in sales proposal and talking point generation include: that manual generation of curated content is not scalable, and often leads to incomplete content; that simple text search based retrieval of content may fail to bring out the complete advantages of an enterprise; and that the time spent in building better sales proposals and talking points can lead to missed opportunities with customers.

Figure 3:
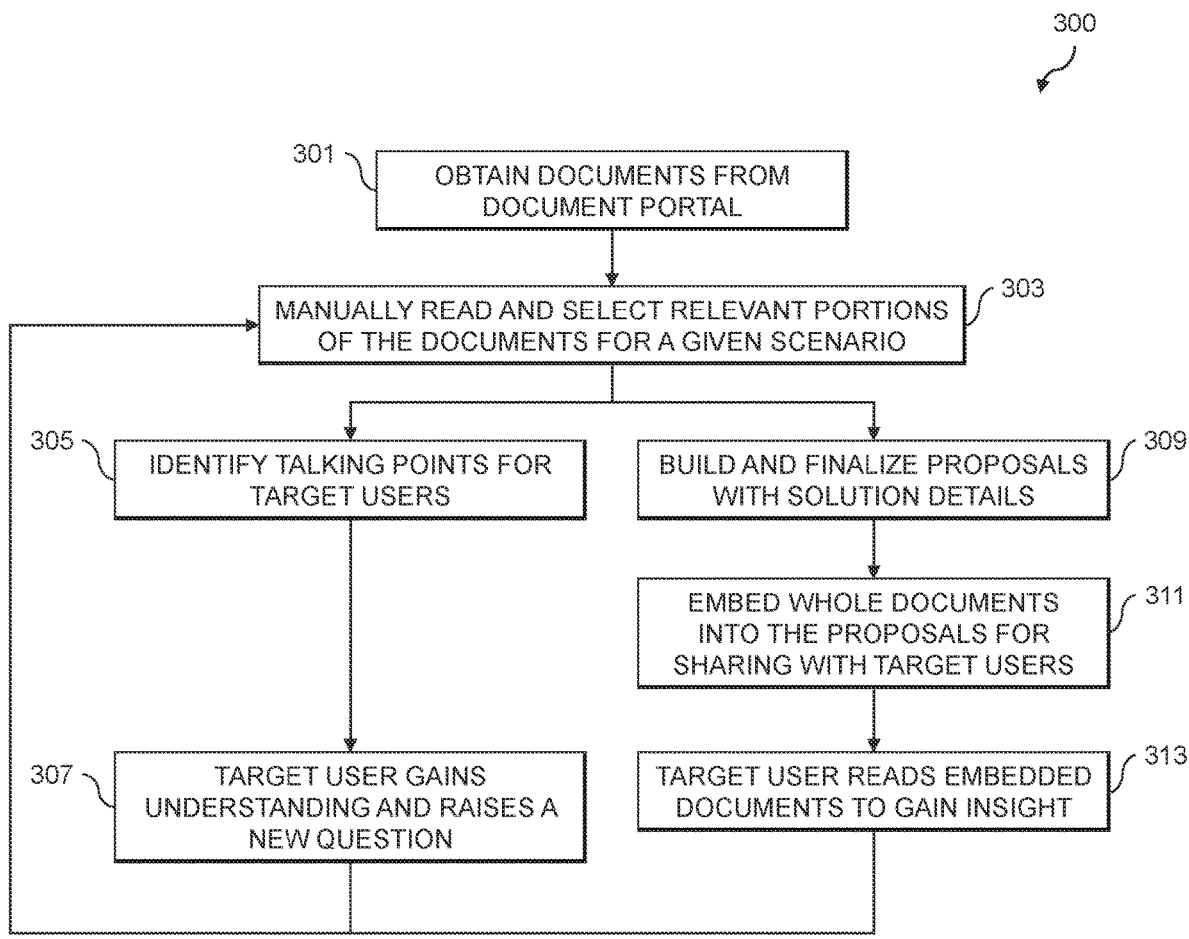
FIG. 3 shows a process flow for building customized content in an illustrative embodiment.

FIG. 3 shows an example process flow 300 for an enterprise team to build customized content for a particular scenario. The process flow 300, for example, may be performed by a sales team of an enterprise. The process flow 300 begins in step 301 with obtaining documents from a document portal. The documents, for example, may include specification sheets, user guides, white papers, presentations, etc. which are obtained from a sales portal. In step 303, the enterprise team manually reads and selects relevant portions of the obtained documents for a given scenario (e.g., a sales scenario). In step 305, the enterprise team identifies talking points for target users (e.g., to put in front of customers). In response to the talking points, the target user may gain some understanding and raise new questions in step 307. Such new questions present a new scenario. The process flow 300 then loops back to step 303 which is conducted for the new scenario.

In step 309, the enterprise team builds and finalizes proposals with solution details. Relevant ones of the obtained documents are embedded into the proposals to share with target users in step 311. In step 313, a target user reads the proposal and the embedded documents to gain insight, and the process flow 300 may then return to step 303 (e.g., for a new scenario). The process flow 300 is thus a recursive and manual loop of activities that is used to build and share intelligence with target users.

Illustrative embodiments provide technical solutions for assimilating content from varied sources (e.g., technical documentation, white papers, case studies, fact or specification sheets, etc.) on topics of key value for target users. The technical solutions described herein are capable of generating new consumable content that ensures contextual continuity in the generated content. Such contextual continuity for user communication and technical documentation enables focused conversations (e.g., talking points) and enhanced proposals. In some embodiments, deep learning is utilized with a Bidirectional Encoder Representations from Transforms (BERT) based machine learning model architecture to generate well formatted consumable content from disparate data sources. Similarity measures (e.g., cosine similarity) are used to compute ranked semantic similarity with custom search terms. Sequence to sequence (Seq2Seq) text generation models are used to generate synthetic sentences whose cosine similarity against position content is used to ensure contextual continuity in generated documents. Advantageously, the technical solutions described herein deliver more in-depth and contextual results with no or minimal manual intervention. The technical solutions described herein also offer an inbuilt re-weighting mechanism to make content contextual.

Figure 4:
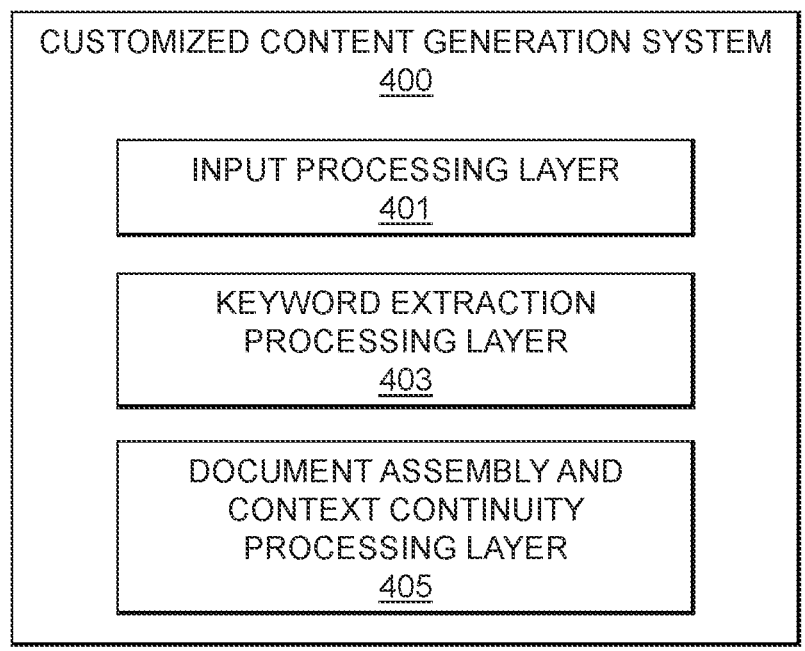
FIG. 4 shows an input processing layer, a keyword extraction processing layer, and a document assembly and context continuity processing layer of a system for building customized content in an illustrative embodiment.

FIG. 4 shows a customized content generation system 400 for building customized content which includes an input processing layer 401, a keyword extraction processing layer 403, and a document assembly and context continuity processing layer 405. The input processing layer 401 is configured to obtain documents, and to extract and chunk the content thereof. The keyword extraction processing layer 403 is configured to implement a BERT-based keyword extraction model, which analyzes document chunks and outputs keywords. The keyword extraction processing layer 403 is further configured to improve precision of the outputted keywords, through using term frequency-inverse document frequency (TF-IDF) logic. The document assembly and context continuity processing layer 405 is configured to convert the keywords extracted by the keyword extraction processing layer 403 into word embeddings, and determines qualified content for a target user or scenario based on a search. This includes computing a distance or similarity between content and the extracted keywords (e.g., using cosine similarity metrics). The document assembly and context continuity processing layer 405 is further configured to build or generate new content using the qualified content.

Figure 5A:
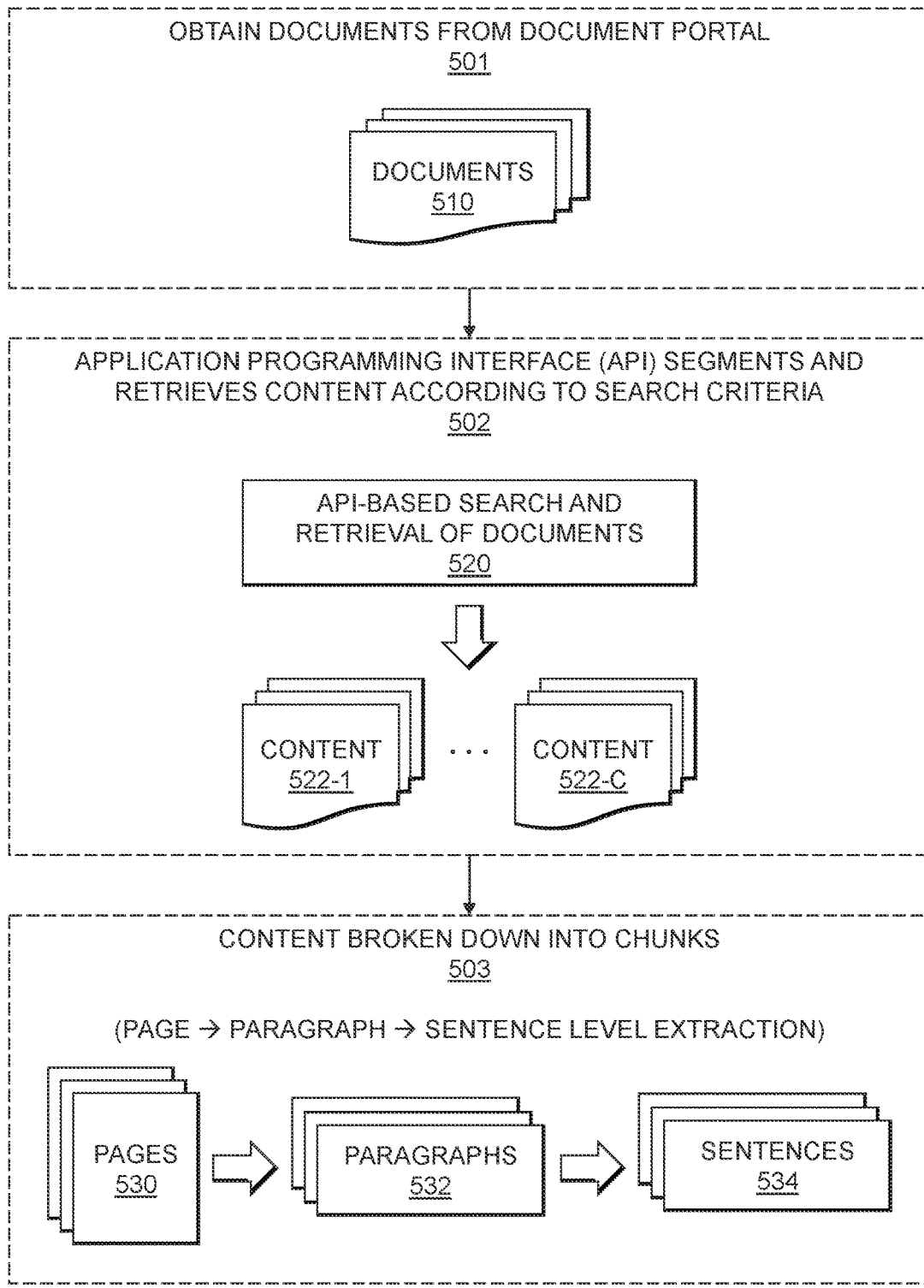
FIGS. 5A-5C show process flows performed by the input processing layer, the keyword extraction processing layer, and the document assembly and context continuity processing layer of the FIG. 4 system for building customized content in an illustrative embodiment.
Figure 5B:
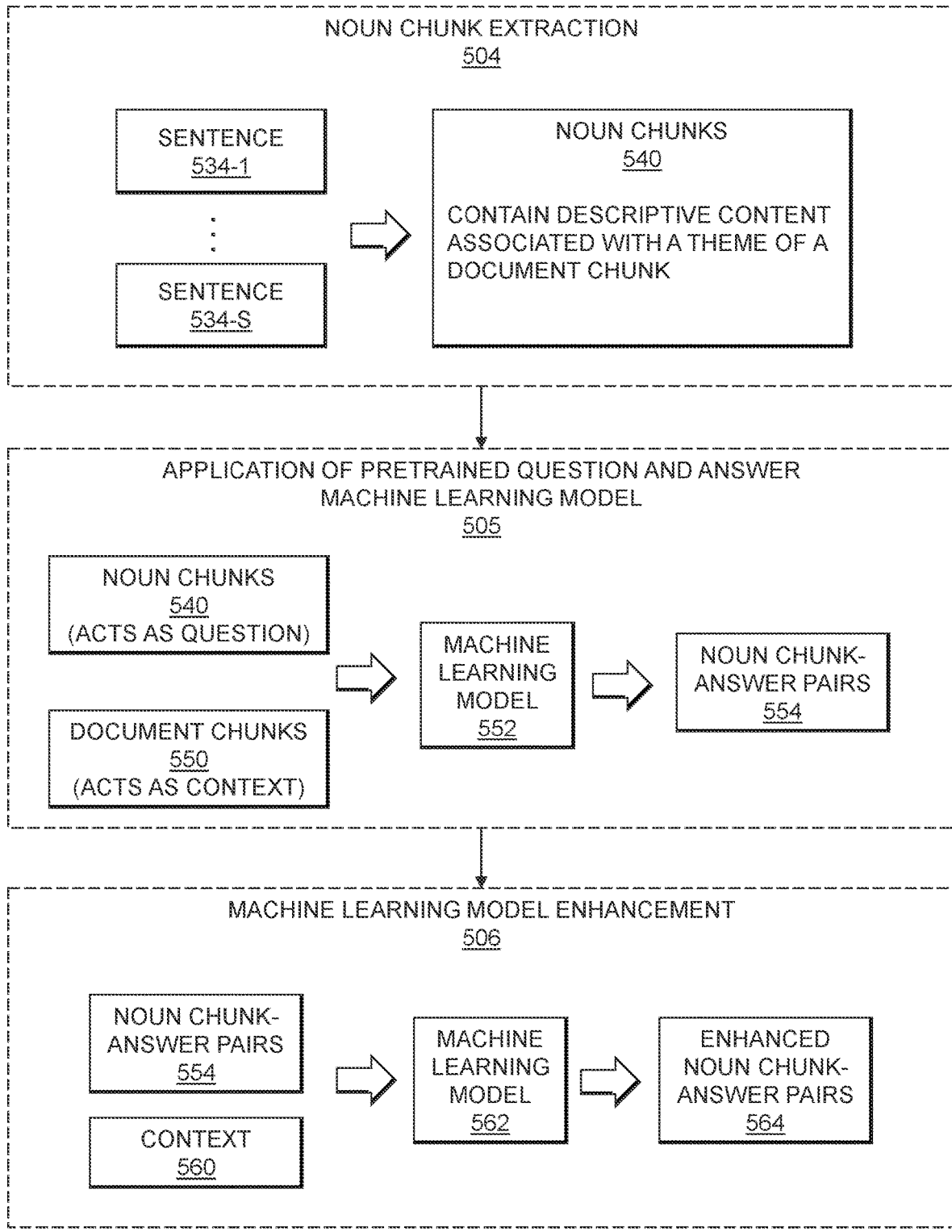
Figure 5C:
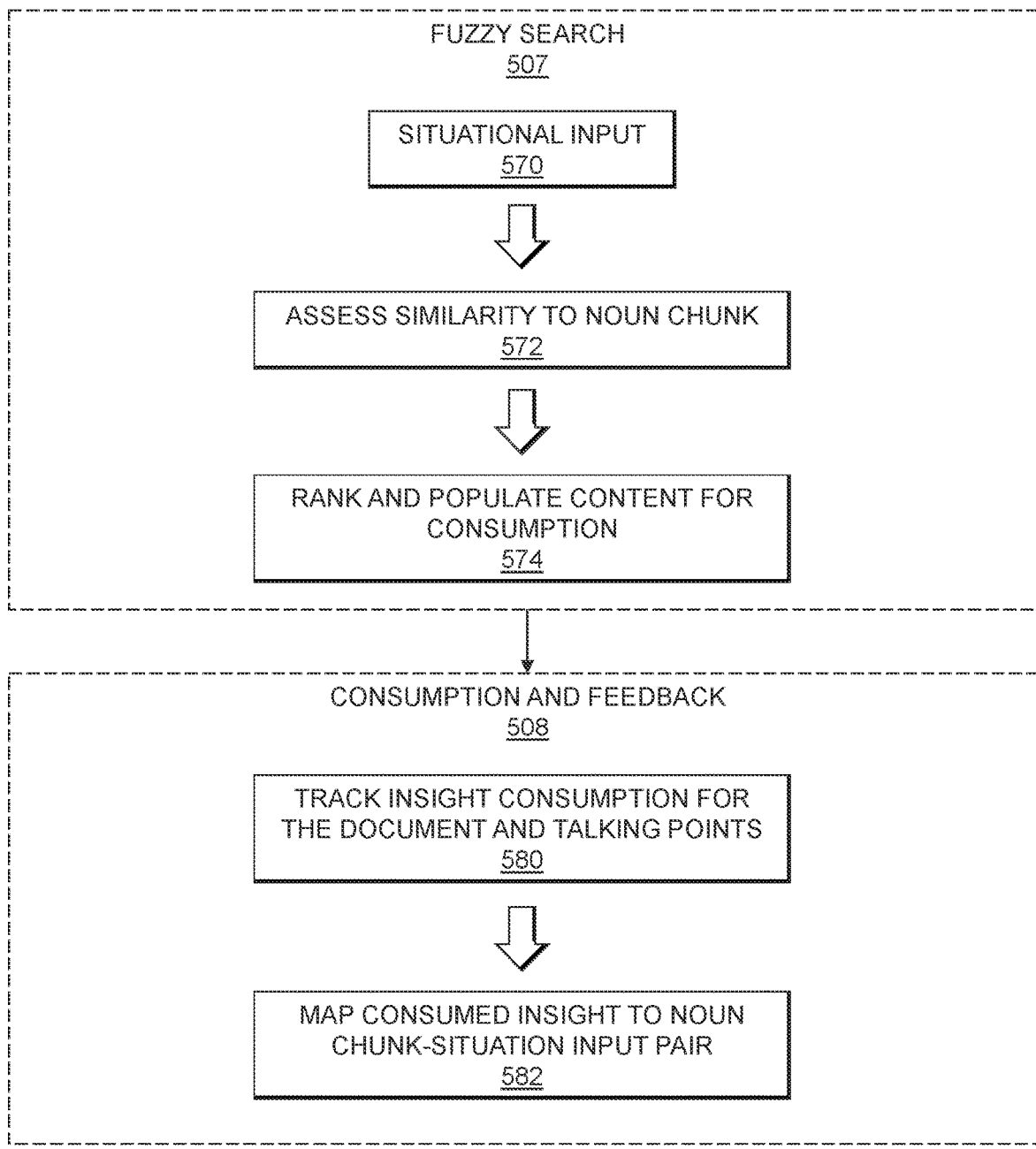

FIGS. 5A-5C show detailed processing flows which may be performed using the input processing layer 401, the keyword extraction processing layer 403, and the document assembly and context continuity processing layer 405 of the customized content generation system 400.

FIG. 5A shows a process flow performed by the input processing layer 401, which begins with obtaining documents 510 from a document portal in step 501. The document portal may be, for example, an enterprise sales portal. It should be appreciated, however, that the documents 510 are not limited to being obtained solely from enterprise internal data sources. One or more of the documents 510 may be retrieved from various external sources. In step 502, an application programming interface (API) is used to segment and retrieve content from the documents 510 according to some designated search criteria. This includes API-based search and retrieval 520 of the documents 510 which are sorted into content 522-1, . . . 522-C (collectively, content 522). The content 522 may be product related, case studies, etc. In step 503, the content 522 is broken down into chunks. This may include breaking the content 522 down into pages 530, paragraphs 532 and sentences 534. The content 522 may also be indexed to retrieve charts, plots, tables, images, videos or other media, etc., along with their associated page/paragraph/sentence positions within the content 522 and documents 510. Step 503 may utilize various tested methods implemented through, for example, Python libraries for breaking down the content 522 into the pages 530, paragraphs 532 and sentences 534. The positions of the pages 530, paragraphs 532 and sentences 534 within the content 522 (or, more generally, the documents 510) may be marked and stored as indexes for later processing. In some embodiments, a first Xth percentile of the paragraphs of a document are labeled as "introduction" while the second Yth percentile of the paragraphs of the document are labeled as "body" and the last Zth percentile of the paragraphs of the document are labeled as "conclusion," where X+Y+Z=100 (e.g., X=25, Y=50, Z=25).

FIG. 5B shows a process flow performed by the keyword extraction processing layer 403, which begins with noun chunk extraction in step 504. The noun chunk extraction may include analyzing sentences 534-1, . . . 534-S (collectively, sentences 534) to identify noun chunks 540 which contain descriptive content associated with a theme of a document chunk. In step 505, a pretrained question and answer machine learning model 552 is utilized to generate noun chunk-answer pairs 554. The machine learning model 552 may comprise a BERT model, which takes as input the noun chunks 540 (acting as questions) and associated document chunks 550 (acting as context) and produces noun chunk-answer pairs 554. Machine learning model enhancement is then performed in step 506, where the noun chunk-answer pairs 554 and context 560 are applied to another machine learning model 562 to produce enhanced noun chunk-answer pairs 564. The machine learning model 562 may be another BERT model. The enhanced noun chunk-answer pairs 564 may be stored in a database or data store (e.g., a structured query language (SQL) database) for future use. Additional detail regarding the processing performed by the keyword extraction processing layer 403 of the customized content generation system 400 will be described in further detail below with respect to FIGS. 6A and 6B.

FIG. 5C shows a process flow performed by the document assembly and context continuity processing layer 405, which begins with a fuzzy search in step 507 that includes providing a situational input 570, assessing similarity 572 to the identified noun chunks 540, and ranking and populating content for consumption 574 as a newly generated or synthesized document and/or talking points. Consumption and feedback is performed in step 508, where insight consumption for the generated document and talking points is tracked 580. Such insight is then mapped to noun chunk-situation input pairs 582. Additional detail regarding the processing performed by the document assembly and context continuity processing layer 405 of the customed content generation system 400 will be described in further detail below with respect to FIGS. 7A-7C.

Figure 6A:
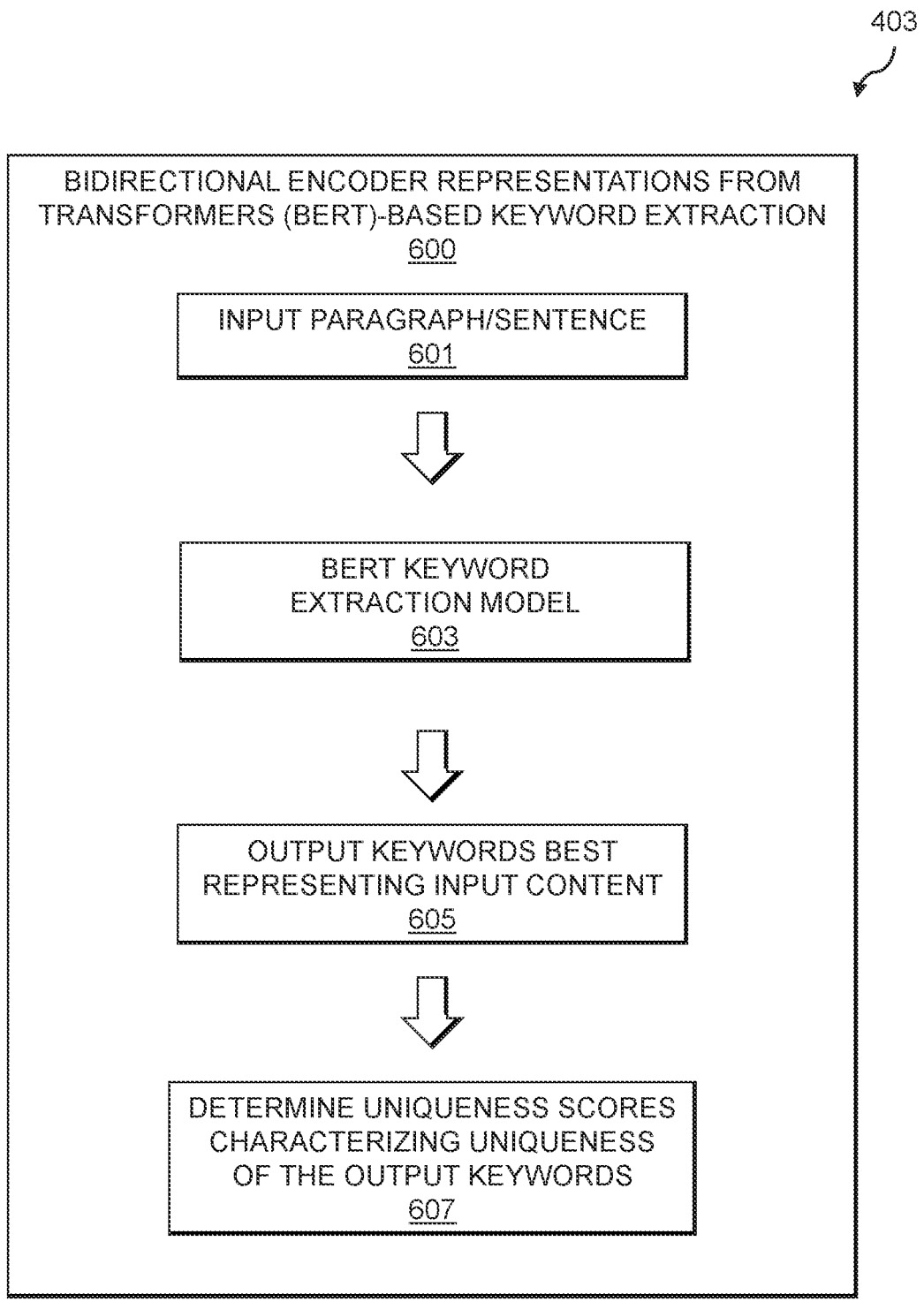
FIGS. 6A and 6B show another process flow performed by the keyword extraction processing layer of the FIG. 4 system for building customized content in an illustrative embodiment.
Figure 6B:
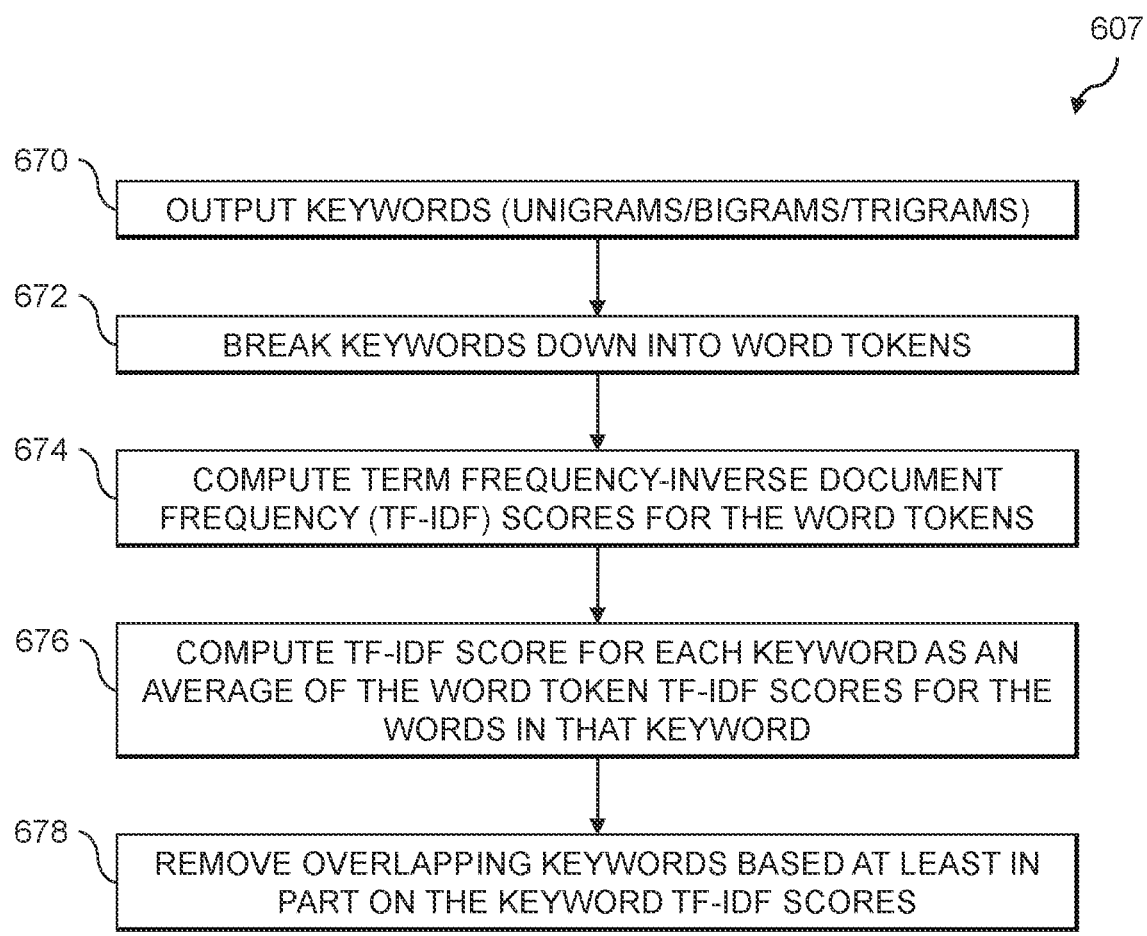

FIGS. 6A and 6B show a detailed processing flow which may be performed by the keyword extraction processing layer 403 in some embodiments. The processing flow, as shown in FIG. 6A, includes use of BERT-based keyword extraction 600 whereby an input paragraph or sentence 601 is provided to a BERT keyword extraction model 603 which outputs keywords 605 that best represent the content of the input paragraph or sentence 601. The output keywords 605 are then analyzed to determine uniqueness scores characterizing the uniqueness of the output keywords 607. In some embodiments, noun chunk extraction is performed for the input paragraph or sentence 601. This may include removing proper noun chunks (e.g., University, Texas, etc.). The BERT keyword extraction model 603 utilizes BERT machine learning, which is a state of the art deep learning algorithm with wide application catering to multiple use cases in natural language processing, including keyword extraction. The BERT keyword extraction model 603 is trained on a large corpus of cross domain articles and reference material (e.g., online sources, technology content, media content, etc.) which makes it a very powerful deep learning algorithm. In some embodiments, a KeyBERT extraction model is used to find relevant keywords from each input paragraph or sentence 601. The keywords may be extracted in unigram (e.g., one keyword), bigram (e.g., a combination of two keywords) and trigram (e.g., a combination of three keywords) form.

Processing for characterizing the uniqueness of the output keywords 607 will now be described with respect to FIG. 6B, which begins with the output keywords (e.g., unigrams/bigrams/trigrams) in step 670 which are then broken down into word tokens in step 672. TF-IDF scores for the word tokens are computed in step 674. TF-IDF scores are computed for each keyword in step 676 as an average of the word token TF-IDF scores for the words in each of the output keywords. Overlapping ones of the output keywords are removed in step 678 based at least in part on the keyword TF-IDF scores computed in step 676.

TF-IDF is a technique for quantifying words in a set of documents. A score is computed for each word to signify its importance in a document and corpus based on its uniqueness. TF-IDF may be used in information retrieval and text mining. In step 674, as noted above, a corpus of all the keywords is created and TF-IDF scores are calculated for each word in the corpus. In step 676, an average TF-IDF score is calculated for each keyword as the mean of the TF-IDF scores of the words in each keyword. In some cases, there may be overlaps between the unigrams, bigrams and trigrams of the output keywords of step 670 leading to a lot of duplication (e.g., "researchers," "researchers capitalize," "researchers capitalize largest," etc.). Such overlapping is removed using the TF-IDF scores in step 678. For example, if a bigram forms a subset of a trigram, then the keyword with the highest TF-IDF score is picked. Similar processing may be used if a unigram forms a subset of a bigram or trigram. This may be performed for each paragraph or sentence to pick unique keywords in order to distinctly identify a particular paragraph or sentence.

Figure 7A:
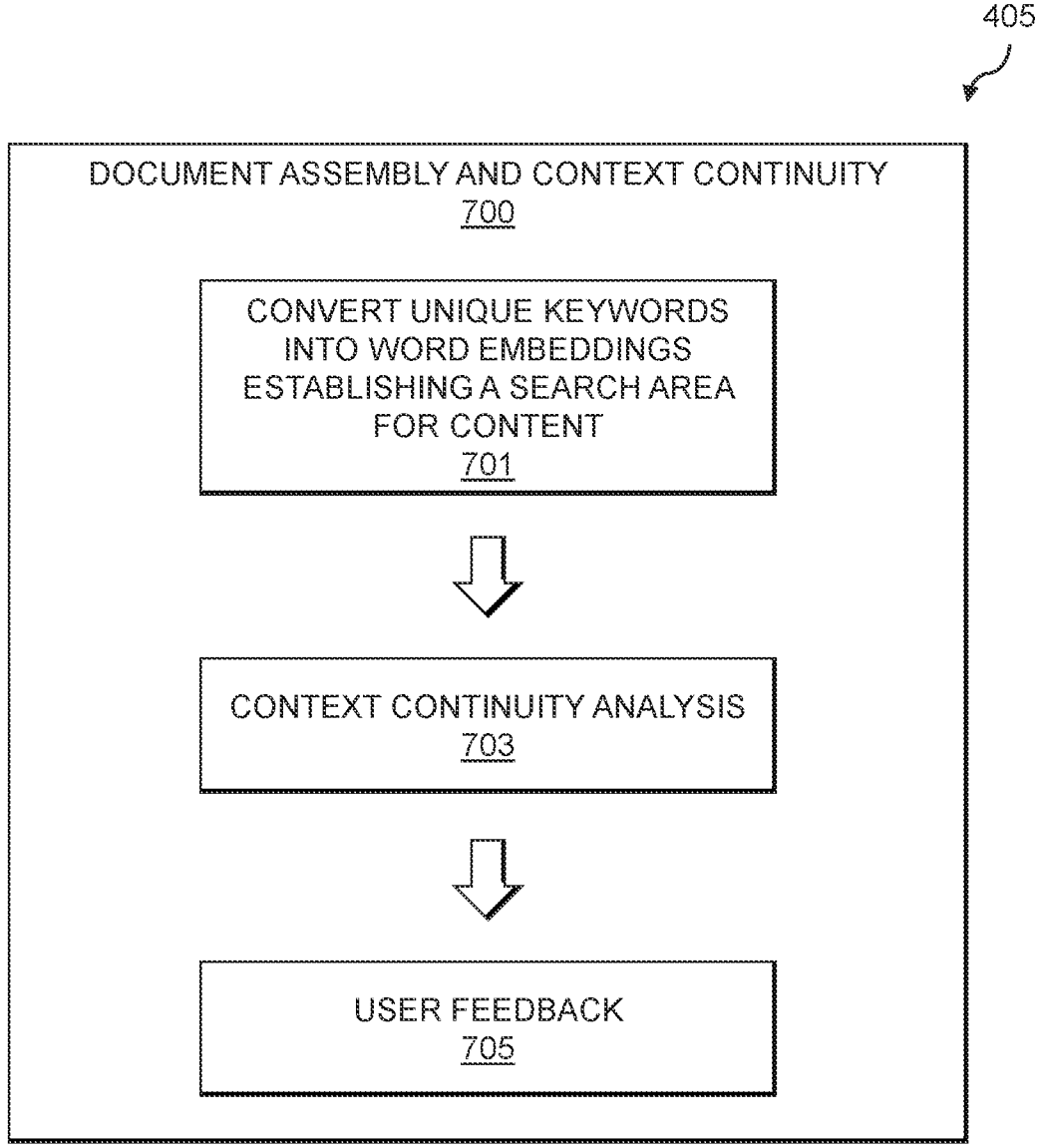
FIGS. 7A-7C show another process flow performed by the document assembly and context continuity processing layer of the FIG. 4 system for building customized content in an illustrative embodiment.
Figure 7B:
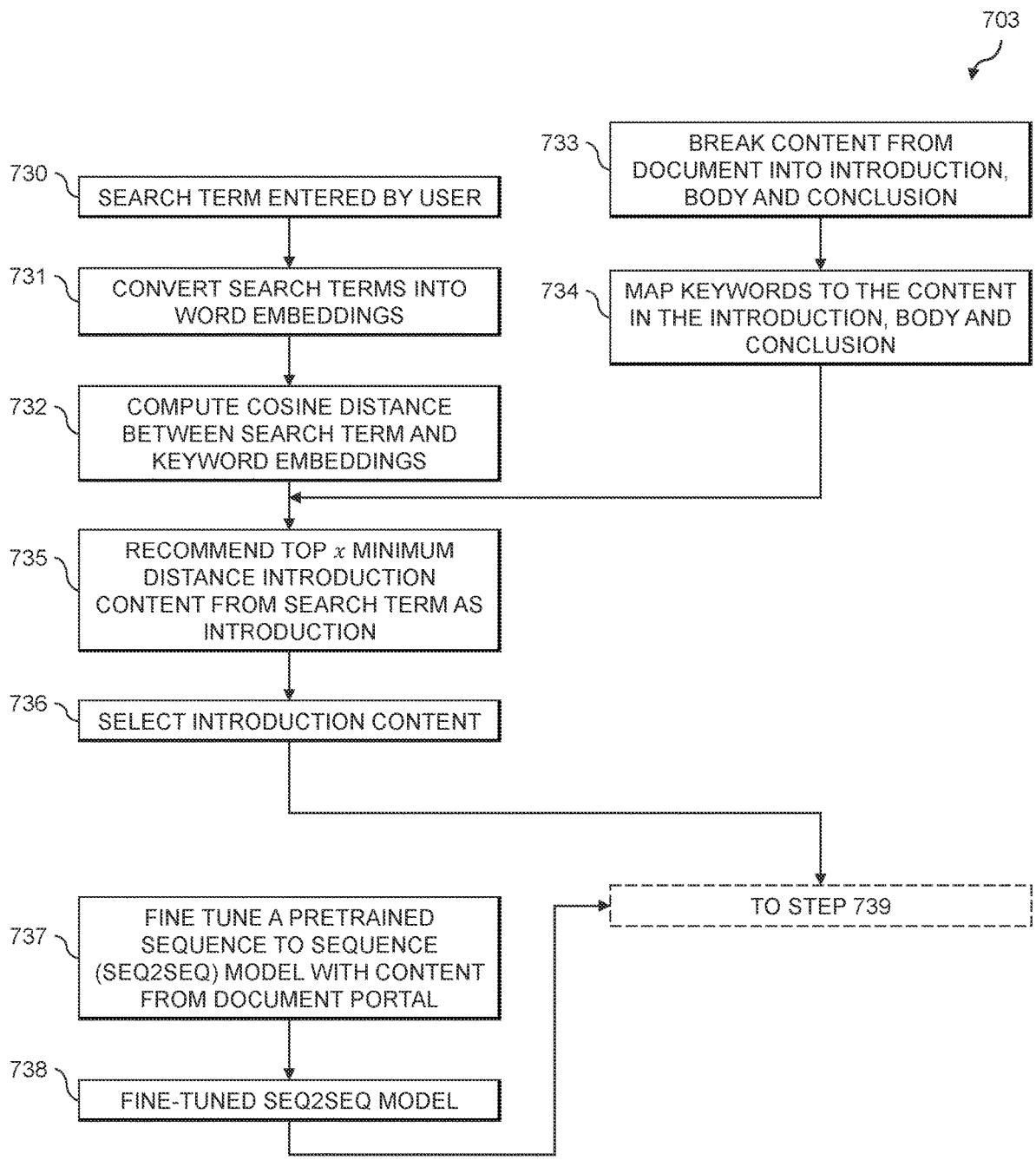
Figure 7C:
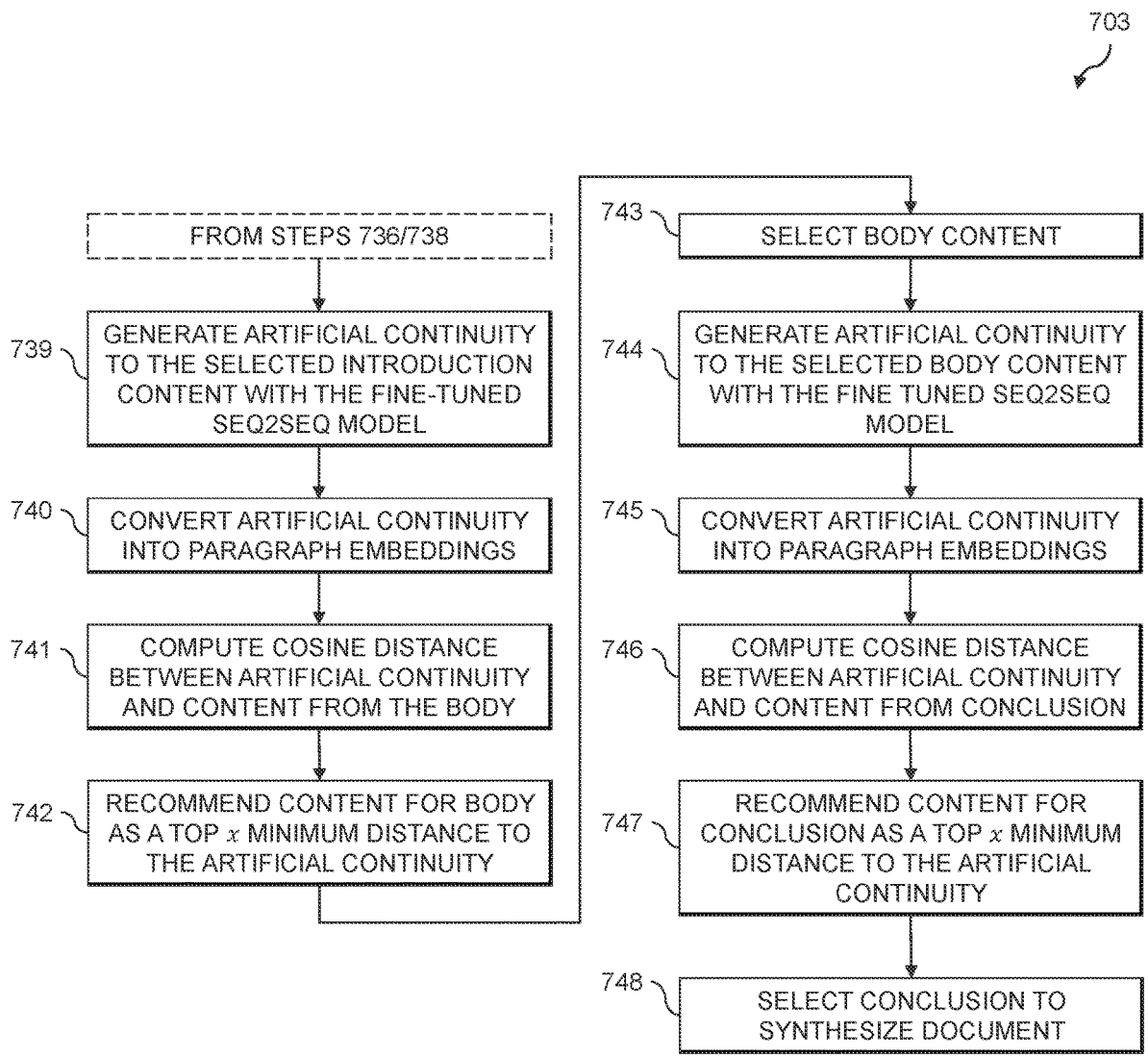

The unique keywords or key phrases are passed on as input to the document assembly and context continuity processing layer 405 for processing as illustrated in FIGS. 7A-7C. Document assembly and context continuity processing 700 includes converting the unique keywords into word embeddings in step 701, establishing a search area for content. Word embeddings provide an approach for representing words and documents. A word embedding, also referred to as a word vector, is a numeric vector input that represents a word in a lower-dimensional space. Word embeddings allow words with similar meanings to have a similar representation, and can also approximate meaning. A word vector or embedding with 50 values can represent 50 unique features. In step 701, each keyword and paragraph is converted into word embeddings. These word embeddings, along with the actual keywords, paragraphs and their corresponding index (e.g., paragraph position) are stored for use in an output layer. In some embodiments, such information is stored in a comma separated value (CSV) format on cloud-based object storage. The word embeddings of step 701 are then used to perform context continuity analysis in step 703.

The context continuity analysis in step 703 may use a story generation model, which receives an input text and proceeds to create a story-like text based on the given input text. The story generation model may comprise, for example, a Seq2Seq machine learning model such as a Generative Pre-trained Transformer 2 (GPT-2) machine learning model. GPT-2 is a transformers model pretrained on a very large corpus of English data in a self-supervised method. This means that the GPT-2 model is pretrained on raw text only with no manual tagging, which is why it can use lots of publicly available data. The GPT-2 model training is an automated process that generates inputs and labels from the input text. More precisely, the GPT-2 model in some embodiments is trained to guess the next phrase in sentences. A generic GPT-2 model may be retrained with enterprise-specific data in order to produce output in line with context specific to a particular enterprise. The dataset on which the GPT-2 model is retrained may be prepared in such a way that dependent and independent variables form a sequence. In other words, if a dependent variable is a paragraph from the introduction section, then the independent variable will be a paragraph from the body section, and if a dependent variable is from the body section, then the independent variable will be a paragraph from the conclusion section. Once the GPT-2 model is retrained, all the paragraphs are made to pass through the model to produce artificial or synthetic paragraphs so that the pair (e.g., input and output) are in continuation. All these paragraph pairs are stored for later use, such as in a CSV format on a bucket of cloud-based object storage. Such processing is represented in FIG. 7B by steps 737 and 738. In step 737, a pretrained Seq2Seq model (e.g., a GPT-2 model) is fine-tuned with content from a document portal (e.g., enterprise-specific data). In step 738, the fine-tuned Seq2Seq model is provided for use in subsequent processing.

Document synthesis will now be described. The output layer (e.g., the document assembly and context continuity processing layer 405 of the customized content generation system 400) allows a user to enter text (e.g., search terms) as shown in step 730 of FIG. 7B. In step 731, this text (the search terms) are converted into word embeddings. The word embeddings of the search terms are then compared with the word embeddings of the keywords (e.g., obtained as described above using the keyword extraction processing layer 403 and in step 701) using cosine distance. In step 733, content from documents is broken down into sections, such as introduction, body and conclusion sections. In step 734, keywords are mapped to the content in the different sections. Such mappings are used, along with the cosine distances computed in step 732, for recommending a set of paragraphs for the input section of a newly generated or synthesized document in step 735. This may include ranking introduction paragraphs based on the cosine distance between the input text and the paragraphs' keywords (e.g., with the least distance given a highest rank, signifying the most similar keyword). In some embodiments, a top x (e.g., 5) paragraphs based on the cosine distance rankings from the introduction section are displayed as an output. In step 736, the user has the option of picking any of the paragraphs displayed, with the selected paragraphs forming the "introduction" part of a newly generated or synthesized document.

Once one or more paragraphs are selected in step 736 as the introduction content for the newly generated or synthesized document, an artificial continuity to the selected introduction content will be generated in step 739, using the fine-tuned Seq2Seq model provided in step 738. This may include, for example, on selection of a paragraph, picking an artificial/synthetic paragraph corresponding to the selected paragraph (e.g. from the CSV file on the cloud-based object storage). In step 740, the artificial/synthetic content generated in step 739 is converted into word embeddings. The embeddings of the artificial continuity is then compared with all paragraphs belonging to the "body" section (e.g., which may be retrieved from the CSV file on the cloud-based object storage having the paragraph embeddings) using cosine similarity in step 741. In step 742, recommended content for the body section of the newly generated or synthesized document is generated by ranking paragraphs based on the cosine distance computed in step 741. In some embodiments, a top x (e.g., 5) paragraphs based on the cosine distance rankings from the body section are displayed as an output. In step 743, the user has the option of picking any of the paragraphs displayed, with the selected paragraphs forming the "body" part of the newly generated or synthesized document.

Similar processing is repeated for generating the "conclusion" section of the synthesized document. In step 744, an artificial continuity to the selected body content will be generated, using the fine-tuned Seq2Seq model provided in step 738. This may include, for example, on selection of a paragraph, picking an artificial/synthetic paragraph corresponding to the selected paragraph (e.g. from the CSV file on the cloud-based object storage). In step 745, the artificial/synthetic content generated in step 744 is converted into word embeddings. The embeddings of the artificial continuity is then compared with all paragraphs belonging to the "conclusion" section (e.g., which may be retrieved from the CSV file on the cloud-based object storage having the paragraph embeddings) using cosine similarity in step 746. In step 747, recommended content for the conclusion section of the newly generated or synthesized document is generated by ranking paragraphs based on the cosine distance computed in step 746. In some embodiments, a top x (e.g., 5) paragraphs based on the cosine distance rankings from the conclusion section are displayed as an output. In step 748, the user has the option of picking any of the paragraphs displayed, with the selected paragraphs forming the "conclusion" part of the newly generated or synthesized document. Once step 748 is completed, all sections of the synthesized document (e.g., introduction, body, conclusion) are completed and the synthesized document is made available (e.g., downloadable in a word processing document format).

Returning to FIG. 7A, following the context continuity analysis processing of step 703 shown in FIGS. 7B and 7C, user feedback 705 is analyzed. Gathering feedback from the user automatically is an important feature in some embodiments, as the feedback loop makes the algorithm self-learning and keeps making results better with increased usage. For example, the content selected by the users based on the choices provided (e.g., the recommendations of steps 735, 742 and 747, and the corresponding user selections in steps 736, 743 and 748) may be stored for future use (e.g., in CSV format on cloud-based object storage). Based on the frequency of each paragraph being clicked or selected by the user, that content may be given priority in future document synthesis iterations when the rankings or recommendations are provided (e.g., in steps 735, 742 and 747).

Figure 8:
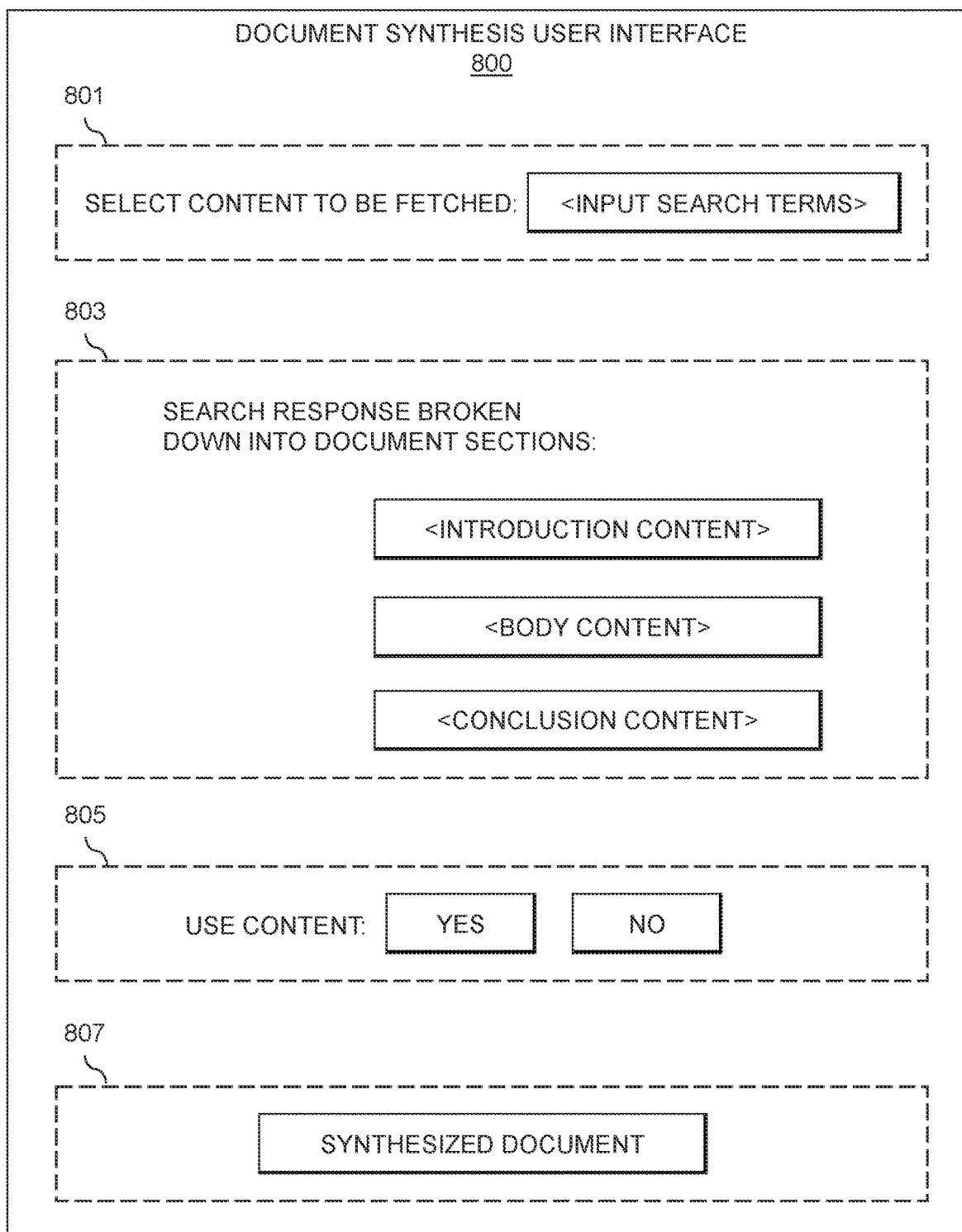
FIG. 8 shows a user interface of a document synthesizing service in an illustrative embodiment.

FIG. 8 shows an example of a document synthesis user interface 800, including an input section 801, a content recommendation section 803, a content selection section 805, and a content output section 807. The input section 801 allows a user to input search terms for content to be fetched (e.g., from a document portal). The input search terms, for example, may be regarding a particular product or solution. The content recommendation section 803 shows the response (e.g., fetched documents) broken down into different position segments or document sections, such as introduction, body and conclusion content. In some cases, the introduction, body and conclusion content are presented serially. As in the process flow of FIGS. 7A-7C, the user may first be presented with recommendations for the introduction content, where the user may select from such recommendations via "yes" and "no" buttons in the content selection section 805. Once content is selected for the introduction section, the body content in the content recommendation section 803 may be populated and the user may again select from among the recommendations via the "yes" and "no" buttons in the content selection section 805. Once content is selected for the body section, the conclusion content in the content recommendation section 803 may be populated and the user may again select from among the recommendations via the "yes" and "no" buttons in the content selection section 805. This may include, for example, highlighting or clicking on different paragraphs/sentences which are populated in the introduction content, body content and conclusion content of the content recommendation section 803 and individually selecting the "yes" or "no" button in the content selection section 805 for each such highlighted or clicked paragraph/sentence. The result is output as a synthesized document in the content output section 807. In some embodiments, the synthesized document includes the source material (e.g., source documents) as links or embedded content.

The technical solutions described herein enable faster generation of custom content using automated processing. Consider, for example, a salesperson of an enterprise that must generate new content for a specific customer scenario. Conventional approaches require the salesperson to log onto a sales portal of the enterprise and enter specific search criteria, which may return a large number of documents matching the search criteria. This may result in a lot of approximate matches, which means the salesperson must scroll through and manually analyze a large number of documents. Once a potentially relevant document is identified, the salesperson must then look within that document for specific content (e.g., using a search function such as Ctrl+F). The technical solutions described herein, in contrast, provide an automated machine learning-based approach that is capable of ingesting, indexing, preprocessing, locating and storing the content that a user is seeking. The user can directly jump to the process of reading comparatively very small chunks of text to compose or synthesize a new document for a particular scenario.

The technical solutions described herein can also advantageously facilitate speedy responses to new queries. Consider, for example, a process of deal negotiation or a pre-sales conversation where questions from a potential customer can come thick and fast. Especially in the presence of a competitor, a lot of questions can be expected to allow the potential customer to compare solution capabilities, performance, etc. The technical solutions described herein provide an approach where response times (e.g., for new scenarios) are very quick, providing curated content in response to a question that can be readily ingested as a document or utilized as talking points with a target user.

Further advantages are provided in that the technical solutions described herein may be extended to diverse content sources. Consider, as an example, the case of video-based content. With small tweaks to data gathering steps, a video can be broken into smaller chunks, indexed and passed through the algorithms described to automatically generate custom video content for a user. Compared with a manual approach where a user has to listen and compile useful content, significant time savings are provided. Video indexing software may be used to recognize events like a pause, change of voice, etc. which can act as the content identifiers similar to recognizing paragraphs and sentences in text data. Thus, the algorithms described may be used to produce a synthesized document that includes a patched or synthesized video with diverse content, etc. Similarly, the synthesized document may include other types of media (e.g., images, audio), tables, charts, plots, etc. Thus, a synthesized document is not limited solely to text content.

In some embodiments, enterprise-specific content may be synthesized with content from other sources. While content loaded onto an enterprise document portal is useful, the technical solutions described herein can also work on external or third-party document portals (e.g., which are authorized as references by an enterprise). Such external or third-party document portals may be useful, for example, in competitive response scenarios as external content can complement internal enterprise-specific content to synthesize powerful documentation for customers. Conventional manual approaches for analyzing third-party content are time-consuming and suffer from loss of detail.

The technical solutions described herein can enable an enterprise to build best in class documentation for its products and for its customers' diverse use cases. As the algorithms used are domain-agnostic, they can be used for different enterprises and provide valuable solutions for any entity with a similar need to synthesize document content for particular scenarios. For example, while various embodiments are described with respect to generating sales-related documentation, embodiments are not limited to generating sales-related documentation. Instead, the technical solutions described herein can be used for generating various types of documentation, including technical documentation, technical blogs, reports, studies, summaries of sets of documents, etc. The algorithms used may auto-generate any desired content (including multimedia content, such as video content, as well as hybrid content including text, images, videos, charts, tables, plots, etc.) based on specific search criteria.

The technical solutions described herein provide a novel approach for "uniqueness" based refinement of keywords. Any paragraph can contain multiple keywords and key phrases which could overlap. Overlapping keywords can make search and comparisons downstream harder and messier. The technical solutions described herein make use of an average TF-IDF score derived from individual word token TF-IDF scores to identify the unique keywords out of overlapping keywords, such that the unique keywords are better representative.

Some embodiments further utilize fine-tuned machine learning models in context continuity analysis. Seq2Seq models based on GPT-2 BERT are trained on a large corpus, and are then fine-tuned. This fine-tuning may include, for example, unfreezing the top most layers with an enterprise-specific corpus to update the language model to recognize enterprise-specific terms and language constructs. This is a transformational step to build context continuity into content flowing in from multiple documents. The output from the model is stored in a database and is leveraged as a user is building a synthesized document to compute context similarities.

The technical solutions described herein provide various technical advantages relative to conventional approaches that are centered around manually annotated text which is extracted based on rules to synthesize new documents. The technical solutions described herein may also be targeted at external customer or user-facing platforms, whereas conventional approaches require significant manual work by users using traditional cut-and-paste techniques to build custom user-facing content. Other conventional approaches may use template-based techniques which use rules-based positioning and blending of content to build new documents.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based generation of synthesized documents will now be described in greater detail with reference to FIGS. 9 and 10. Although described in the context of system 100, these platforms may also be used to implement at least portions of other information processing systems in other embodiments.

Figure 9:
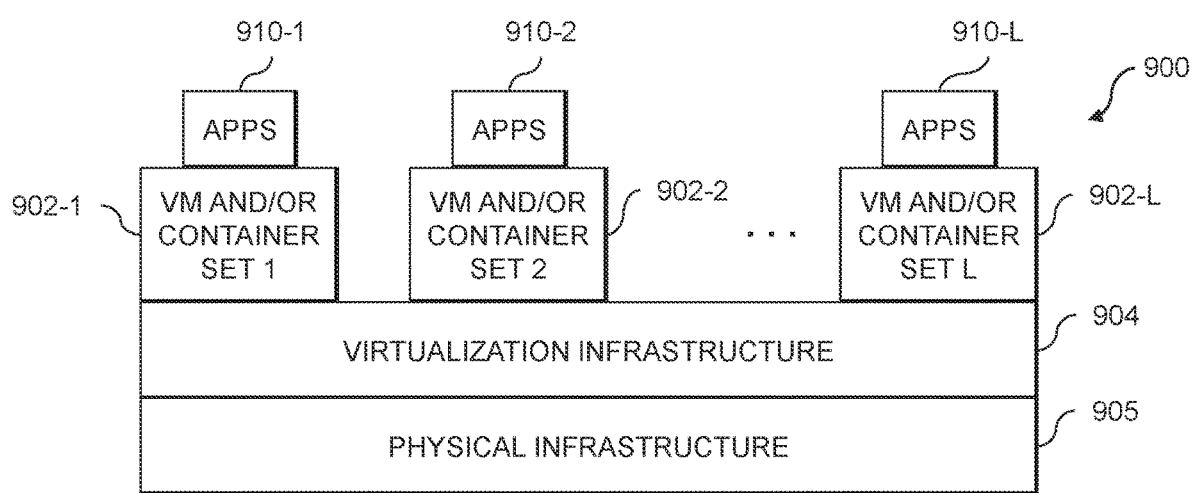
FIGS. 9 and 10 show examples of processing platforms that may be utilized to implement at least a portion of an information processing system in illustrative embodiments.
Figure 10:
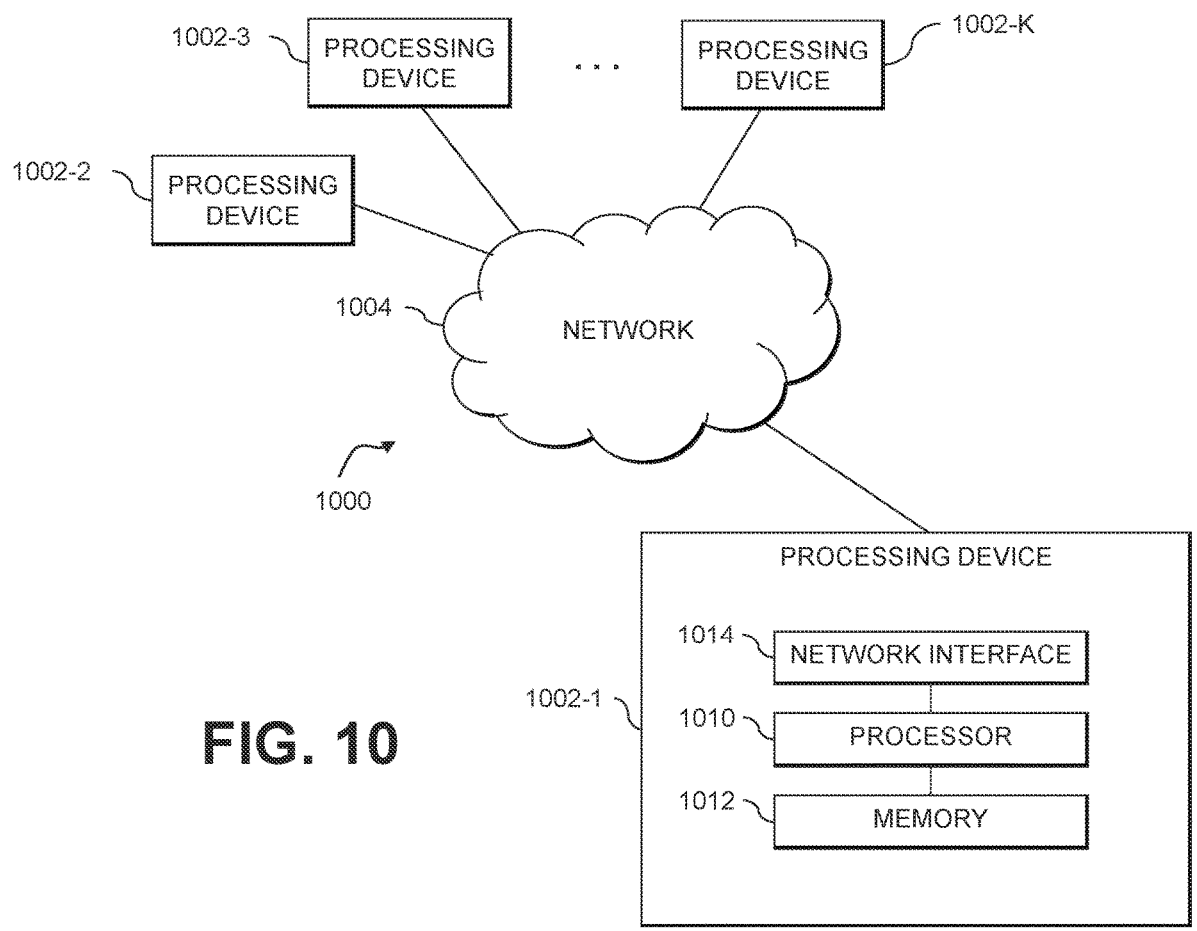

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based generation of synthesized documents as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, documents, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
     receiving a request to generate a synthesized document, the request comprising a query with one or more search terms;
     extracting, utilizing a first machine learning model, keywords from a set of documents, each of the documents comprising two or more different sections, wherein the two or more different sections comprise a first section and at least a second section;
     selecting first content from the set of documents for inclusion in a first section of the synthesized document, the first content being selected based at least in part on a determined similarity of the one or more search terms and one or more of the extracted keywords from the first section of at least one document in the set of documents;
     determining, utilizing a second machine learning model that takes as input the selected first content, a set of terms for a second section of the synthesized document;
     selecting second content from the set of documents for inclusion in the second section of the synthesized document, the second content being selected based at least in part on a determined similarity of the determined set of terms for the second section of the synthesized document and one or more of the extracted keywords from the second section of at least one document in the set of documents; and
     generating the synthesized document comprising the selected first content and the selected second content.

2. The apparatus of claim 1 wherein extracting the keywords from the set of documents comprises associating section labels with the extracted keywords, the section label for a given keyword identifying which of the two or more different sections of a given document that the given keyword is extracted from.

3. The apparatus of claim 1 wherein selecting the first content comprises selecting content from first sections of one or more of the set of documents having keywords exhibiting at least a threshold similarity with the one or more search terms.

4. The apparatus of claim 1 wherein selecting the second content comprises selecting content from second sections of one or more of the set of documents having keywords exhibiting at least a threshold similarity with the determined set of terms for the second section of the synthesized document.

5. The apparatus of claim 1 wherein extracting the keywords from the set of documents comprises breaking the set of documents into content chunks, and extracting one or more keywords from each of the content chunks.

6. The apparatus of claim 5 wherein the content chunks comprise at least one of pages, paragraphs and sentences of textual content.

7. The apparatus of claim 5 wherein the content chunks comprise sections of multimedia content.

8. The apparatus of claim 1 wherein extracting the keywords from the set of documents comprises removing one or more overlapping ones of the extracted keywords based at least in part on term frequency-inverse document frequency (TF-IDF) scores computed for each of the extracted keywords, the TF-IDF score for a given one of the extracted keywords being based at least in part on TF-IDF scores computed for each of two or more words of the given extracted keyword.

9. The apparatus of claim 1 wherein the first machine learning model comprises a Bidirectional Encoder Representations from Transformers (BERT) keyword extraction model.

10. The apparatus of claim 1 wherein the second machine learning model comprises a sequence to sequence machine learning model.

11. The apparatus of claim 10 wherein the sequence to sequence machine learning model is trained on a first corpus of text data from a plurality of enterprise-generic data sources, and is fine-tuned on a second corpus of text data from one or more enterprise-specific data sources.

12. The apparatus of claim 1 wherein determining the similarity between the one or more search terms and the extracted keywords comprises:
    determining a first set of word embeddings for the one or more search terms and a second set of word embeddings for the extracted keywords; and
    computing a cosine similarity between the first and second sets of word embeddings.

13. The apparatus of claim 1 wherein the first section of the synthesized document comprises an introduction section, and wherein the second section of the synthesized document comprises a body section.

14. The apparatus of claim 13 wherein the two or more different sections further comprise at least a third section, and wherein the at least one processing device is further configured to perform the steps of:
    determining, utilizing the second machine learning model that takes as input the selected second content, a set of terms for a third section of the synthesized document, the third section of the synthesized document comprising a conclusion section;
    selecting third content from the set of documents for inclusion in the third section of the synthesized document, the third content being selected based at least in part on a determined similarity of the determined set of terms for the third section of the synthesized document and one or more of the extracted keywords from the third section of at least one document in the set of documents; and
    generating the synthesized document comprising the first content, the second content and the third content.

15. A computer program product comprising a non-transitory processor-readable storage medium having stored therein program code of one or more software programs, wherein the program code when executed by at least one processing device causes the at least one processing device to perform steps of:

receiving a request to generate a synthesized document, the request comprising a query with one or more search terms;

extracting, utilizing a first machine learning model, keywords from a set of documents, each of the documents comprising two or more different sections, wherein the two or more different sections comprise a first section and at least a second section;

selecting first content from the set of documents for inclusion in a first section of the synthesized document, the first content being selected based at least in part on a determined similarity of the one or more search terms and one or more of the extracted keywords from the first section of at least one document in the set of documents;

determining, utilizing a second machine learning model that takes as input the selected first content, a set of terms for a second section of the synthesized document;

selecting second content from the set of documents for inclusion in the second section of the synthesized document, the second content being selected based at least in part on a determined similarity of the determined set of terms for the second section of the synthesized document and one or more of the extracted keywords from the second section of at least one document in the set of documents; and generating the synthesized document comprising the first content and the second content.

16. The computer program product of claim 15 wherein the first section of the synthesized document comprises an introduction section, and wherein the second section of the synthesized document comprises a body section.

17. The computer program product of claim 16 wherein the two or more different sections further comprise at least a third section, and wherein the program code when executed further causes the at least one processing device to perform the steps of:

determining, utilizing the second machine learning model that takes as input the selected second content, a set of terms for a third section of the synthesized document, the third section of the synthesized document comprising a conclusion section;

selecting third content from the set of documents for inclusion in the third section of the synthesized document, the third content being selected based at least in part on a determined similarity of the determined set of terms for the third section of the synthesized document and one or more of the extracted keywords from the third section of at least one document in the set of documents; and generating the synthesized document comprising the selected first content and the selected second content.

18. A method comprising:

receiving a request to generate a synthesized document, the request comprising a query with one or more search terms;

extracting, utilizing a first machine learning model, keywords from a set of documents, each of the documents comprising two or more different sections, wherein the two or more different sections comprise a first section and at least a second section;

selecting first content from the set of documents for inclusion in a first section of the synthesized document, the first content being selected based at least in part on a determined similarity of the one or more search terms and one or more of the extracted keywords from the first section of at least one document in the set of documents;

determining, utilizing a second machine learning model that takes as input the selected first content, a set of terms for a second section of the synthesized document;

selecting second content from the set of documents for inclusion in the second section of the synthesized document, the second content being selected based at least in part on a determined similarity of the determined set of terms for the second section of the synthesized document and one or more of the extracted keywords from the second section of at least one document in the set of documents; and generating the synthesized document comprising the selected first content and the selected second content;

wherein the method is performed by at least one processing device comprising a processor coupled to a memory.

19. The method of claim 18 wherein the first section of the synthesized document comprises an introduction section, and wherein the second section of the synthesized document comprises a body section.

20. The method of claim 19 wherein the two or more different sections further comprise at least a third section, and further comprising:

determining, utilizing the second machine learning model that takes as input the selected second content, a set of terms for a third section of the synthesized document, the third section of the synthesized document comprising a conclusion section;

selecting third content from the set of documents for inclusion in the third section of the synthesized document, the third content being selected based at least in part on a determined similarity of the determined set of terms for the third section of the synthesized document and one or more of the extracted keywords from the third section of at least one document in the set of documents; and generating the synthesized document comprising the selected first content, the selected second content and the selected third content.

* * * * *